United States Patent [19]

Alberts et al.

[11] 4,412,039

[45] Oct. 25, 1983

[54] CROSSLINKED SILICONE-VINYL POLYMER SYSTEMS

[75] Inventors: Heinrich Alberts; Hans Friemann; Hans-Heinrich Moretto, all of Cologne; Hans Sattlegger, Odenthal; Fritz Mietzsch, Cologne, all of Fed. Rep. of Germany

[73] Assignee: Bayer Aktiengesellschaft, Leverkusen, Fed. Rep. of Germany

[21] Appl. No.: 284,295

[22] Filed: Jul. 17, 1981

[30] Foreign Application Priority Data

Aug. 9, 1980 [DE] Fed. Rep. of Germany ....... 3030195

[51] Int. Cl.$^3$ .............................................. C08L 83/10
[52] U.S. Cl. ....................................... 525/106; 525/59
[58] Field of Search ........................................ 525/106

[56] References Cited

U.S. PATENT DOCUMENTS 3,686,356  8/1972  Saam ................................... 525/106
3,794,694  2/1974  Chadha ............................... 525/479

FOREIGN PATENT DOCUMENTS 2832893  2/1979  Fed. Rep. of Germany .
766528  1/1957  United Kingdom .
806582  12/1958  United Kingdom .
869482  5/1961  United Kingdom .

*Primary Examiner*—Wilbert J. Briggs, Sr.
*Attorney, Agent, or Firm*—Sprung, Horn, Kramer & Woods

[57] ABSTRACT

A co-grafted polymer dispersion comprising blocks of an organopolysiloxane with OH functional groups, blocks of an ethylene/vinyl ester copolymer containing about 5 to 99% by weight of incorporated vinyl ester, and blocks of vinyl monomer units polymerized in the presence of mixtures of the organopolysiloxane and ethylene/vinyl ester copolymer, the organopolysiloxane and ethylene/vinyl ester copolymer blocks being linked via vinyl polymer bridges. The dispersions mixed with suitable catalysts, can cure under the influence of atmospheric moisture to elastic tack-free rubbers suitable as sealants.

8 Claims, No Drawings

CROSSLINKED SILICONE-VINYL POLYMER SYSTEMS

The invention relates to stable co-grafted polymer dispersions which can be cured at room temperature and comprise organopolysiloxanes containing terminal OH functional groups and, if appropriate, other polydiorganosiloxanes, and ethylene/vinyl ester copolymers and vinyl polymers, a process for their preparation and the use of these co-grafted polymer dispersions.

Polymer systems whch are based on organopolysiloxanes and can be cured at room temperature are known (compare, for example, W. Noll, Chemie und Technologie der Silikone (Chemistry and Technology of the Silicones), Verlag Chemie GmbH, 1968, page 391 et seq.).

Furthermore, it is possible, and known, to prepare modified organopolysiloxanes by various procedures. Grafted polymers of organosiloxanes and vinyl polymers are described, for example, in British Patent Specifications Nos. 766,528; 806,582 and 869,482 and DE-AS (German Published Specification) No. 1,694,973. The use of organopolysiloxanes with an organic chain grafted on and at most 25% of aryl radicals in 1- or 2-component compositions which cure at room temperature is described in DE-AS (German Published Specification) No. 1,694,983. It is stated that the hydroxypolysiloxanes employed according to that invention contain in each case up to at most 25% of aryl radicals. It is also stated that the organic chain grafted on is formed by polymerized units of vinyl monomers, preferably styrene and acrylates.

Mixtures of a non-silicone polymer, for example a polyolefin, olefin copolymers, such as ethylene/alkyl acrylate or ethylene/vinyl ester copolymers, and a monoorganopolysiloxane resin are also known (DT-OS (German Published Specification) No. 2,832,893). These polymer compositions which are described in DT-OS (German Published Specification) No. 2,832,893 can be processed from the melt and are used for coating, for example, wires and have a low oxygen index, but they cannot be used as sealing compositions which cure at room temperature as a result of moisture in the environment.

The use of block or graft copolymers of 5-95% by weight of a polydiorganosiloxane and 5-95% by weight of a homopolymeric or copolymeric vinyl thermoplastic, as a homogenizing agent, for the preparation of a homogeneous mixture of a polydiorganosiloxane and a vinyl thermoplastic is described in DT-AS (German Published Specification) No. 2,142,597, the vinyl thermoplastic mentioned being present in an amount of at least 40% by weight, relative to the total of weight of the mixture. The preparation of the graft copolymers is always carried out with the aid of polyorganosiloxanes with reactive groups which react with the free radicals of the polymerization system. Examples of such reactive groups are silicon-bonded vinyl or 3-mercaptopropyl groups. One route for the production of the mixtures of vinyl thermoplastic and polydiorganosiloxane consists in dissolving the polydiorganosiloxane and, for example, the graft copolymer in a vinyl monomer and then polymerizing the vinyl monomer. The resulting uniform dispersions of polyorganosiloxanes in the vinyl thermoplastics imparts improved processing properties to the vinyl thermoplastic. Use of these mixtures for elastomeric silicone compositions which are obtained by curing with atmospheric moisture at room temperature is not mentioned, and could furthermore not take place with such systems.

Ethylene/vinyl acetate copolymers are industrially important thermoplastics and elastomers. A particularly outstanding characteristic of these copolymers is their excellent resistance to aging, even at elevated temperatures. Mixtures of polydiorganosiloxanes and ethylene/vinyl acetate copolymers are unstable, since the starting polymers are completely incompatible. Although it would be desirable to combine the excellent use properties of ethylene/vinyl acetate copolymers with those of silicone elastomers, this has as yet not been achieved in an industrially satisfactory manner.

The object of the invention is thus to provide multiphase systems of organopolysiloxanes and ethylene/vinyl acetate copolymers, the phases of which are stable.

Another object of the invention is to provide silicone compositions which, if appropriate after the addition of plasticizers, such as, for example, organopolysiloxanes with methyl end groups, fillers, crosslinking agents, crosslinking catalysts and components which accelerate crosslinking, and after crosslinking at room temperature in a manner which is in itself known, can be lacquered in a better manner and have an improved adhesion to various substrates.

Both objects have been achieved by subjecting mixtures of organopolysiloxanes, ethylene/vinyl ester copolymers and vinyl monomers to free radical polymerization in the presence of agents which form free radicals. Stable dispersions which consist of an ethylene/vinyl ester copolymer component, an organopolysiloxane and polymerized units of one or more vinyl monomers and which contain graft copolymers, crosslinked via polymerized units of the vinyl monomers employed, of the organopolysiloxane and the ethylene/vinyl ester copolymer employed are obtained.

The invention thus relates to co-grafted polymer dispersions, characterized in that they contain organopolysiloxanes with OH functional groups and, if appropriate, other polydiorganosiloxanes, and ethylene/vinyl ester copolymers containing about 5 to 99% by weight of incorporated vinyl ester, vinyl monomer units polymerized in the presence of mixtures of these organopolysiloxanes and ethylene/vinyl ester copolymers, and organopolysiloxane and ethylene/vinyl ester copolymer components linked via vinyl polymer bridges.

The invention relates to co-grafted polymer dispersions comprising about I. 10-90% by weight of organopolysiloxanes with terminal OH functional groups, II. 0-40% by weight of organopolysiloxanes with trimethylsilyl end groups, III. 5-85% by weight of ethylene/vinyl ester copolymers containing 5-99% by weight of incorporated vinyl ester, and IV. 5-85% by weight of polymerized units of vinyl compounds, the sum of components I-IV always being 100%.

The invention also relates to co-grafted polymer dispersions comprising about I. 10-90% by weight of organopolysiloxanes containing terminal OH functional groups, II. 0-40% by weight of organopolysiloxanes with trimethylsilyl end groups, III. 5-85% by weight of ethylene/vinyl acetate copolymers containing 5-99% by weight of incorporated vinyl acetate, and IV. 5-85% by weight of polymerized units of vinyl esters, α,β-unsaturated carboxylic acids, derivatives of α,β-unsaturated mono- or di-carboxylic acids, vinyl-aromatic compounds, such as styrene, α-methylstyrene or 4-chlorostyrene, α-olefins, such as ethylene, propylene, 1-butene or isobutylene, halogenated vinyl monomers, such as vinyl chloride, vinylidene chloride, vinyl fluoride, vinylidene fluoride, tetrafluoroethylene or trifluorochloroethylene, vinyl ethers, such as ethylene vinyl ether or n-butyl vinyl ether, allyl compounds, such as allyl alcohol, allyl acetate, allyl carbonates, diallyl carbonate or diallyl phthalate, divinyl compounds, such as divinylbenzene or divinyl ethers, or (meth)acrylic acid esters of polyhydric alcohols, or mixtures of these monomers, the sum of components I-IV always being 100%.

The invention also relates to co-grafted polymer dispersions comprising about I. 10-90% by weight of organopolysiloxanes containing terminal OH functional groups, II. 0-40% by weight of organo-polysiloxanes with trimethylsilyl end groups, III. 5-85% by weight of ethylene/vinyl acetate copolymers containing 25-75% by weight of incorporated vinyl acetate, IV. 5-85% by weight of polymerized vinyl acetate units, and V. 0-80% by weight of polymerized units of (meth)acrylic acid $C_1$-$C_8$-alkyl esters, (meth)acrylamide, N-alkyl-substituted (meth)acrylamides, (meth)acrylonitrile and mixtures thereof, the sum of the components always being 100%.

The invention also relates to co-grafted polymer dispersions comprising about I. 10-90% by weight of organopolysiloxanes containing terminal OH functional groups, II. 0-40% by weight of organopolysiloxanes with trimethylsilyl end groups, III. 5-85% by weight of ethylene/vinyl acetate copolymers containing 25-75% by weight of incorporated vinyl acetate, and IV. 5-85% by weight of polymerized units of (a) 0-90% by weight of styrene, (b) 10-100% by weight of (meth)acrylic acid $C_1$-$C_8$-alkyl esters and (c) 0-90% by weight of (meth)acrylonitrile, the sum of components IVa to IVc always being 100% and the sum of components I-IV likewise always being 100%.

The co-grafted polymer dispersions according to the invention preferably comprise about I. 30-90% by weight of organopolysiloxanes containing terminal OH functional groups, II. 0-40% by weight of organopolysiloxanes with trimethylsilyl end groups, III. 5-65% by weight of ethylene/vinyl acetate copolymers containing 25-75% by weight of incorporated vinyl acetate, and IV. 5-65% by weight of polymerized vinyl acetate units.

The invention also relates to a process for the preparation of co-grafted polymer dispersions, characterized in that mixtures of about I. 8-90% by weight of organopolysiloxanes containing terminal OH functional groups, II. 0-40% by weight of organopolysiloxanes with trimethylsilyl end groups, III. 4.999-85% by weight of ethylene/vinyl ester copolymers containing 5-99% by weight of incorporated vinyl esters, IV. 5-85% by weight of one or more vinyl monomers and V. 0.001-2% by weight of one or more agents which form free radicals, the sum of components I-V always being 100%, are subjected to a polymerization reaction, if appropriate in the presence of chain-transfer substances or molecular weight regulators, at temperatures between room temperature and +250° C. and under pressures between 100 mm Hg and 500 bars.

The invention furthermore relates to organopolysiloxane compositions which can be crosslinked at room temperature and contain the co-grafted polymer dispersions and, in addition, crosslinking agents, curing catalysts, fillers, and, if appropriate, further additives.

The invention also relates to the use of organopolysiloxane compositions which can be crosslinked at room temperature and contain the co-grafted polymer dispersions according to the invention, as one- or two-component systems for sealing compositions.

The co-grafted polymer dispersions are prepared by a procedure in which mixtures of an organopolysiloxane containing terminal OH functional groups, an ethylene/vinyl ester copolymer containing 5-99% by weight of incorporated vinyl ester, preferably vinyl acetate, and one or more vinyl monomers, if appropriate in the presence of solvents or diluents, such as, for example, water, and, if appropriate, molecular weight regulators, are brought, in the presence of one or more agents which form free radicals, to a reaction temperature which triggers off the polymerization. If desired, it is also possible for mixtures of organopolysiloxanes which contain terminal OH functional groups and non-functional organopolysiloxanes to be introduced into the reaction mixture. The polymerization can be carried out by a continuous or discontinuous process. In principle, the components to be reacted can be added in any desired sequence, but the best results are achieved when mixtures of the siloxane and poly-(ethylene/vinyl ester) components and the vinyl monomers are employed simultaneously in carrying out the polymerization reaction.

The oganopolysiloxanes containing terminal OH groups are essentially linear and are represented by the following formula:

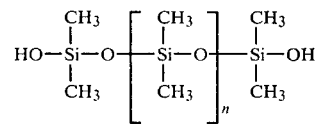

n = 10 to 5000

In addition to methyl groups, the organopolysiloxane components can also contain up to 30 mol% of ethyl groups, vinyl groups and phenyl groups, but methyl-substituted organopolysiloxanes are preferably employed.

The ethylene/vinyl ester copolymers employed are prepared by the known processes of medium-pressure or high-pressure synthesis, if appropriate in solvents, such as tert.-butanol, or in aqueous emulsion.

Possible vinyl esters are organic vinyl esters of saturated $C_1$-$C_{18}$-monocarboxylic acids which are optionally substituted by halogen, in particular chlorine, such as vinyl formate, vinyl acetate, vinyl propionate, vinyl chloropropionate, vinyl butyrate, vinyl isobutyrate, vinyl laurate, vinyl myristate, vinyl stearate and vinyl benzoate. Vinyl acetate is preferably employed. The molecular weights of the ethylene/vinyl ester copolymers are between about 1,000 and over 1 million, preferably between about 1,500 and 250,000.

If desired, the ethylene/vinyl ester copolymers can be used in the completely or partially saponified form.

Examples which may be mentioned of vinyl monomers which are particularly suitable for the grafting reaction are: olefins, such as ethylene, propylene and isobutylene, vinyl esters of aliphatic or aromatic carboxylic acids, preferably vinyl acetate and vinyl propionate, α,β-unsaturated mono- or di-carboxylic acids and derivatives thereof, compounds which may be mentioned being (meth)acrylic acid, methyl (meth)acrylate, ethyl (meth)acrylate, propyl or isopropyl (meth)acrylate, n-butyl, iso-butyl or tert.-butyl (meth)acrylate, 2-ethylhexyl (meth)acrylate, (meth)acrylamide, N-alkyl-substituted (meth)acrylamide derivatives, (meth)acrylonitrile, maleic anhydride, maleamide, N-alkylmaleimides and maleic acid half-esters or diesters, vinyl-aromatic compounds, such as styrene, α-methylstyrene and 4-chlorostyrene, vinyl chloride, vinylidene chloride, vinylidene fluoride, tetrafluoroethylene and vinyl ethers, such as ethyl vinyl ether and n-butyl vinyl ether; and from the series of allyl compounds there may be mentioned allyl alcohol, allyl acetate, isobutene diacetate, 2-methylenepropane-1,3-diol, allyl ethyl carbonate and allyl phenyl carbonate. If crosslinking or increase in the molecular weights of the vinyl resin phase is desired, poly-unsaturated vinyl compounds or allyl compounds can be employed. Compounds which may be mentioned are divinylbenzene, (meth)acrylates of polyhydric alcohols, such as, for example, ethylene glycol dimethacrylate and diethylene glycol diacrylate, and divinyl ether.

The free radical polymerization of the vinyl monomers can be started in a manner which is in itself known, with the aid of agents which form free radicals, UV-rays or α- or β-rays or by means of heat, without further additives. Polymerization initiated by radiation is preferably carried out in the presence of sensitizers (compare, for example, A. D. Jenkins and A. Ledwith, Reactivity, Mechanism and Structure in Polymer Chemistry, John Wiley and Son, London, New York, 1974, page 465).

To start the free radical polymerization of the vinyl monomers, agents which form free radicals are employed in amounts of between about 0.001 and 2, preferably about 0.02 and 0.8% by weight, relative to the total mixture of organopolysiloxane, EVA copolymer and vinyl monomer. Examples which may be mentioned of agents which form free radicals are azo initiators, such as bis-isobutyronitrile (AIBN), azo-esters, azo-iminoesters or azo-N-alkylamides, peroxides, such as di-tert.-butyl peroxide, di-cumyl peroxide and di-benzoyl peroxide, peresters, such as amyl perpivalate, tert.-butyl perpivalate, tert.-butyl peroctoate, t-butyl perbenzoate and tert.-butyl perneodecanoate, percarbonates, such as cyclohexyl percarbonate or bis-isopropyl percarbonate, or hydroperoxides, such as, for example, cumyl hydroperoxide and tert.-butyl hydroperoxide.

Other suitable initiators are benzopinacol, benzopinacol derivatives or other thermally highly substituted ethane derivatives.

The polymerization can also be started with the aid of redox systems at lower temperatures than the temperatures at which the agents which form free radicals decompose purely thermally.

Examples of redox initiators which may be mentioned are combinations of peroxides and amines, such as for example, benzoyl peroxide and triethylamine, trialkyl-boron compounds and oxygen, hydroperoxides and sulphinic acids, formaldehyde or aldoses or combinations with low-valent transition metal salts, or peroxide/SO$_2$ systems.

The polymerization reaction can be carried out continuously or discontinuously, under normal pressure or under reaction pressure of up to, for example, 300 bars, preferably up to 15 bars, and at reaction temperatures between −20° C. and +250° C., preferably at 70° to 190° C. If desired, the polymerization can also be carried out in the presence of solvents or diluents, of which there may be mentioned water, alcohols, such as methanol, ethanol and tert.-butanol, aliphatic or aromatic hydrocarbons, halogenated hydrocarbons, such as chlorobenzene or fluorinated compounds, ethers, such as dioxane or tetrahydrofuran, and esters, such as, for example, ethyl acetate.

The polymerization is preferably carried out, however, in the absence of a solvent.

If desired, the polymerization reaction can be carried out in the presence of molecular weight regulators. Examples of regulators which may be mentioned are mercaptans, such as n- or tert.-dodecylmercaptan, thioglycol, thioglycerol and thioacetates. Also sulphur-free molecular weight regulators, such as hydrocarbons, examples which may be mentioned being paraffin fractions, such as, for example, petroleum ether, light petrol or wash benzine, and α-olefins, such as, for example, propylene, isobutylene and 1-butene, and furthermore ketones, such as, for example, acetone, methyl ethyl ketone or cyclohexanone, and also aldehydes, such as, for example, formaldehyde, acetaldehyde, propionaldehyde or isobutyraldehyde, and allyl compounds, such as, for example, allyl alcohol, allyl acetate, isobutene diacetate or allyl carbonates. Other possible telogens are halogenated hydrocarbons, such as methylene chloride, tetrachloroethane, dibromoethane and the like. As was to be expected, the viscosities of the dispersions can be controlled with the aid of such regulators.

The reaction of the monomers employed is determined by the polymerization process chosen and the reaction conditions. In the case of a discontinuous polymerization procedure, the objective is conversions which are as high as possible, so that at least 80% of the monomers employed, but preferably more than 90%, are reacted. The residual monomers are removed by known processes, by distillation under normal pressure or under reduced pressure. The residual monomer contents still effectively found in the dispersions after working up are negligibly small; they are in general less than 1,000 ppm, and preferably less than 100 ppm.

If desired, antioxidants, stabilizers UV-absorbers, anti-aging agents, plasticizers and substances having a fungistatic or bacteriostatic action can be introduced into the batch when the polymerization has ended.

The fillers customarily used in the preparation of silicone elastomers can also be employed. Such fillers are silicas which have been prepared by various processes and have various specific surface areas.

The silicone-ethylene/vinyl ester copolymer-vinyl polymer dispersions obtained according to the invention are particularly suitable for use in 1- and 2-component compositions which cure at room temperature. As is known, such compositions, which cure in accordance with the condensation principle, consist of polydiorganosiloxanes with hydroxyl end groups, crosslinking agents, fillers and catalysts.

All or some of the polydiorganosiloxanes with hydroxyl end groups can be replaced by the co-grafted polymer dispersions according to the invention. Silanes which have, in the molecule, at least 3 groups which can easily be split off hydrolytically, such as carboxylic acids, carboxamides, oximes, amine oxides and amines, are employed as the crosslinking agents. Examples of reinforcing fillers are pyrogenically produced silicon dioxide, and a non-reinfocing filler which can be used is, for example, chalk. The catalysts used are, inter alia, organic tin compounds, such as dibutyl-tin laurate.

Silicone compositions in which the co-grafted polymer dispersions according to the invention are used can be coated with commercially available lacquers, for example, lacquers based on alkyd resins or polyurethanes, considerably better than the silicone compositions known hitherto. The silicone compositions which contain, as constituents from which they are built up, the co-grafted polymers according to the invention and which have been cured at room temperature can be lacquered in the same manner as wood. It has also been found that the adhesion of these novel systems to wood, metals and concrete is excellent, even under wet conditions. The following examples illustrate the preparation of the silicone-ethylene/vinyl ester copolymer-vinyl polymer dispersions according to the invention.

PREPARATION OF THE STARTING SUBSTANCES

The polysiloxanes with OH functional groups are prepared in a manner which is in itself known (compare, for example, W. Noll, Chemie und Technologie der Silikone (Chemistry and Technology of Silicones), Verlag Chemie GmbH, Weinheim/Bergstr., 2nd edition, 1968, chapter 5, page 162 et seq.).

The polydimethylsiloxanes with OH functional groups given in the examples are characterized as follows:

| OH—polysiloxane No. | Viscosity (mPas) at 20° C. |
| --- | --- |
| 1 | 5,000 |
| 2 | 10,000 |
| 3 | 18,000 |
| 4 | 50,000 |

The ethylene/vinyl ester copolymers (EVA) are characterized by the following data:

| EVA | Vinyl acetate content (% by weight) | $\eta[dl/g]$ |
| --- | --- | --- |
| A | 45 | 1.4 |
| B | 42 | 0.15 |
| C | 44 | 0.09 |
| D | 62 | 1.4 |
| E | 45 | 0.25 |

EXAMPLE 1

1,000 g of OH-polysiloxane 1 are warmed to 110° C. under nitrogen in a 3 l kettle.

A solution of 350 g of styrene, 350 g of n-butyl acrylate, 300 g of EVA E and 3.5 g of benzoyl peroxide is then added dropwise in the course of 3 hours. The mixture is then subsequently stirred for a further 3 hours at 110° C. The unreacted monomers are removed by distillation. A homogeneous, white dispersion with a viscosity of 43,000 (mPas) at 25° C. is obtained.

EXAMPLE 2

1,000 g of OH-polysiloxane 1 are heated at 110° C. under nitrogen in a 3 l kettle and a solution of 700 g of styrene, 300 g of EVA E and 3.5 g of benzoyl peroxide is then added in the course of 3 hours. The mixture is subsequently stirred at 110° C. for 3 hours and the volatile constituents are stripped off in vacuo. A stable dispersion with a viscosity of 48,000 (mPas) is obtained.

EXAMPLE 3

14.5 kg of OH-polysiloxane 1 and 4.35 kg of EVA B are warmed to 110° C. under nitrogen in a 40 l stirred autoclave. 2 solutions are then simultaneously added dropwise in the course of 3 hours:

Solution 1: 9 kg of vinyl acetate

Solution 2: 1.15 kg of vinyl acetate and 51 g of benzoyl peroxide.

The mixture is then subsequently stirred for a further 3 hours at 110° C. The volatile constituents are removed by distillation in vacuo. A homogeneous, fine-particled dispersion with a viscosity of 33,000 (mPas) is obtained.

EXAMPLES 4 AND 5

The solutions given in the table are added to 14,500 g of OH-polysiloxane 1 at 110° C. under nitrogen in a 40 l stirred autoclave:

| Example No. | Styrene g | n-Butyl acrylate g | EVA B g | EVA C g | Benzoyl peroxide g | Viscosity (mPas) |
| --- | --- | --- | --- | --- | --- | --- |
| 4 | 5075 | 5075 | 4350 | — | 51 | 24,000 |
| 5 | 5075 | 5075 | — | 4350 | 51 | 28,000 |

The mixture is then subsequently polymerized for a further 3 hours at 110° C. to a monomer conversion of 92%. The volatile constituents are removed by distillation in vacuo. The finished dispersions have the viscosities given in the table.

EXAMPLE 6

1,000 g of OH-polysiloxane 2, 200 g of EVA A, 500 g of styrene and 50 g of methyl acrylate are warmed to 200° C. in a 3 l pressure autoclave, while stirring with a blade stirrer. A solution of 1.8 g of di-tert.-butyl peroxide in 300 g of styrene, 50 g of methyl acrylate and 0.5 g of tert.-dodecylmercaptan is added at 200° C. in the course of 2 hours. After stirring the mixture for a further 2 hours, it is cooled and the product is drained off. The monomer conversion is virtually quantitative. The viscosity of the dispersion is 14,500 (mPas).

EXAMPLE 7

100 g of OH-polysiloxane 1 are warmed to 170° C. A solution of 18.75 g of EVA A in 71.25 g of styrene, 10 g of methacrylate and 0.55 g of tert.-butyl perpivalate is then added in the course of 1 hour. The solution is then subsequently stirred at 170° C. for 1 hour and the volatile constituents are then removed by distillation. The finished dispersion has a viscosity of 24,000 (mPas).

EXAMPLE 8

1000 g of OH-polysiloxane 1 are warmed to 80° C. under nitrogen, and a solution of 2,360 g of tert.-butanol, 640 g of EVA D, 1000 g of vinyl acetate and 6 g of tert.-butyl perpivalate is added in the course of 2 hours, while stirring. The mixture is then subsequently stirred at 80° C. for 4 hours. The solvent and residual monomers are removed by distillation. The resulting dispersion has a viscosity of 147,000 (mPas).

EXAMPLE 9

500 g of EVA A are dissolved in 2000 g of tert.-butanol at an internal temperature of 80° C. under nitrogen in a 6 l stirred kettle. A solution of 500 g of vinyl acetate, 500 g of tert.-butanol and 1.5 g of tert.-butyl perpivalate is then added and the mixture is stirred for 2 hours. A solution of 1,000 g of OH polysiloxane 3, 500 g of vinyl acetate and 2 g of tert.-butyl perpivalate is then added dropwise in the course of 1 hour. The mixture is subsequently stirred for 4 hours and the solvent and residual monomers are then distilled off. The homogeneous dispersion has a viscosity of 141,000 (mPas). The compositions prepared by the process described here were mixed according to the following recipe and cured under the influence of moisture, with the aid of crosslinking agents and catalysts which promote crosslinking: 200 g of co-grafted polymer, 10.4 g of a titanium complex of the following approximate composition:

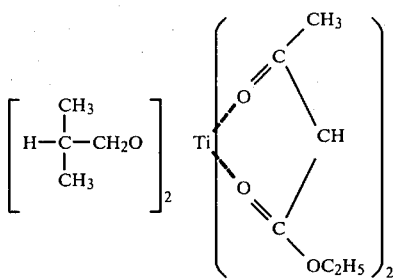

11.4 g of bis-(N-methylbenzamido)-ethoxymethylsilane and 2.2 g of dibutyl-tin diacetate.

The crosslinked products are elastic and free from tackiness. They were coated with an alkyd lacquer, the adhesion of which to the silicone was determined after 7 days with the aid of the cross-hatch test, by cutting a 2.54 cm square on the lacquered surface into 100 square pieces of equal size with a razor blade, so that a painted surface with a grid-like appearance is obtained. A strip of adhesive tape (tesa film No. 101 from Messrs. Beiersdorf AG, Hamburg) is then pressed firmly onto this grid. Thereafter, the strip of adhesive tape is removed by being slowly pulled off at an angle of about 30° C. The percentage value of the retention of the lacquer is obtained from the number of painted square pieces which remain on the cured formulation after the strip of adhesive tape has been removed. The physical properties and the results of the cross-hatch test can be seen from the following table.

For Comparison Examples 10 and 11, instead of the co-grafted polymers, polysiloxane 1 is used in Example 10 and polysiloxane 4 is used in Example 11.

| Example | Evenness of lacquer | Adhesion of laquer % | E modulus (100% elongation) [N/mm²] | Tensile strength [N/mm²] | Elongation at break % |
|---|---|---|---|---|---|
| 1 | good | 100 | 0.260 | 0.572 | 457 |
| 2 | satisfactory | 100 | 0.762 | — | 100 |
| 3 | good | 95 | 0.244 | 0.327 | 498 |
| 4 | good | 67 | 0.234 | 0.362 | 400 |
| 5 | good | 72 | 0.274 | 0.390 | 427 |
| 6 | good | 63 | — | — | — |
| 7 | good | 44 | — | — | — |
| 8 | good | 33 | 0.614 | 1.141 | 302 |
| 9 | good | 42 | 0.578 | 1.269 | 330 |
| 10 | poor | 0 | 0.141 | 0.299 | 295 |
| 11 | poor | 18 | 0.097 | 0.313 | 544 |

What is claimed is:

1. A co-grafted polymer dispersion comprising blocks of an organopolysiloxane with OH functional groups, blocks of an ethylene/vinyl ester copolymer containing about 5 to 99% by weight of incorporated vinyl ester, and blocks of vinyl monomer units polymerized in the presence of mixtures of the organopolysiloxane and ethylene/vinyl ester copolymer, the organopolysiloxane and ethylene/vinyl ester copolymer blocks being linked via vinyl polymer bridges, the OH-terminated organopolysiloxane blocks constituting 10–90% and the vinyl monomer blocks constituting 5–85% of the weight of the recited blocks.

2. A co-grafted polymer dispersion according to claim 1, comprising by weight about
   I. 10–90% of blocks of an organopolysiloxane with terminal functional OH groups,
   II. 0–40% of blocks of an organopolysiloxane with trimethylsilyl end groups,
   III. 5–85% of blocks of an ethylene/vinyl ester copolymer containing 5–99% of incorporated vinyl ester, and
   IV. 5–85% of polymerized units of at least one vinyl compound, the sum of components I–IV being 100%.

3. A co-grafted polymer dispersion according to claim 1, comprising by weight about
   I. 10–90% of blocks of an organopolysiloxane containing terminal OH functional groups,
   II. 0–40% of blocks of an organopolysiloxane with trimethylsilyl end groups,
   III. 5–85% of blocks of an ethylene/vinyl acetate copolymer containing 5–99% of incorporated vinyl acetate, and
   IV. 5–85% of polymerized units of at least one vinyl compound selected from the group consisting of vinyl esters, α,β-unsaturated carboxylic acids, derivatives of α,β-unsaturated mono or di-carboxylic acids, styrene, α-methylstyrene, 4-chlorostyrene, ethylene, propylene, 1-butene, isobutylene, vinyl chloride, vinylidene chloride, vinyl fluoride, vinylidene fluoride, tetrafluoroethylene, trifluorochloroethylene, ethylene vinyl ether, n-butyl vinyl ether, allyl alcohol, allyl acetate, allyl carbonate, diallyl carbonate, diallyl phthalate, divinylbenzene, divinyl ether and (meth)acrylic acid esters of polyhydric alcohols, the sum of components I–IV being 100%.

4. A co-grafted polymer dispersion according to claim 1, comprising by weight about
   I. 10–90% of blocks of an organopolysiloxane containing terminal OH functional groups,
   II. 0–40% of blocks of an organopolysiloxane with trimethylsilyl end groups,
   III. 5–85% of blocks of an ethylene/vinyl acetate copolymer containing 25–75% of incorporated vinyl acetate,
   IV. 5–85% of polymerized vinyl acetate units, and
   V. 0–80% of polymerized units of at least one member selected from the group consisting of (meth)acrylic acid $C_1$–$C_8$-alkyl ester, (meth)acrylamide, N-alkyl-substituted (meth)acrylamides and (meth)acrylonitrile, the sum of the components being 100%.

5. A co-grafted polymer dispersion according to claim 1, comprising by weight about
   I. 10–90% of blocks of an organopolysiloxane containing terminal OH functional groups,
   II. 0–40% of blocks of an organopolysiloxane with trimethylsilyl end groups, III. 5-85% of blocks of an ethylene/vinyl acetate copolymer containing 25-75% of incorporated vinyl acetate, and
IV. 5-85% of polymerized units of (a) 0-90% of styrene, (b) 10-100% of (meth)acrylic acid $C_1$-$C_8$-alkyl esters and (c) 0-90% of (meth)-acrylonitrile, the sum of components IVa to IVc being 100% and the sum of components I-IV likewise being 100%.

6. A co-grafted polymer dispersion according to claim 1 comprising by weight about
I. 30-90% of blocks of an organopolysiloxane containing terminal OH functional groups,
II. 0-40% of blocks of an organopolysiloxane with trimethylsilyl end groups,
III. 5-65% of blocks of an ethylene/vinyl acetate copolymer containing 25-75% of incorporated vinyl acetate, and
IV. 5-65% of polymerized vinyl acetate units.

7. A process for the preparation of a co-grafted polymer dispersion according to claim 1, comprising subjecting to polymerization in the presence of a chain transfer substance and/or a molecular weight regulator, and at a temperature between about $-20$ and $+250°$ C. and a pressure between about 100 mm Hg and 500 bars, a mixture comprising by weight about
I. 8-90% of an organopolysiloxane containing terminal OH functional groups,
II. 0-40% of an organopolysiloxane with trimethylsilyl end groups,
III. 4.999-85% of an ethylene/vinyl ester copolymer containing 5-99% of incorporated vinyl ester,
IV. 5-85% of at least one vinyl monomer and
V. 0.001-2% of at least one agent which forms free radicals, the sum of components I-IV being 100%.

8. A process for sealing an opening comprising filling said opening with a mixture of a dispersion according to claim 1 and a curing catalyst therefor, and allowing said mixture to cure in the presence of moisture.

* * * * *